June 1, 1965   A. R. WELLS ETAL   3,187,163
COMBINATION CONTAINER, HEATER AND CONTROL UNIT
Filed Oct. 25, 1962   2 Sheets-Sheet 1

INVENTORS
ALTON R. WELLS
ROBERT M. WELLS
BY
ATTYS.

June 1, 1965　　　A. R. WELLS ETAL　　　3,187,163
COMBINATION CONTAINER, HEATER AND CONTROL UNIT
Filed Oct. 25, 1962　　　　　　　　　　　　2 Sheets-Sheet 2
FIG. 4
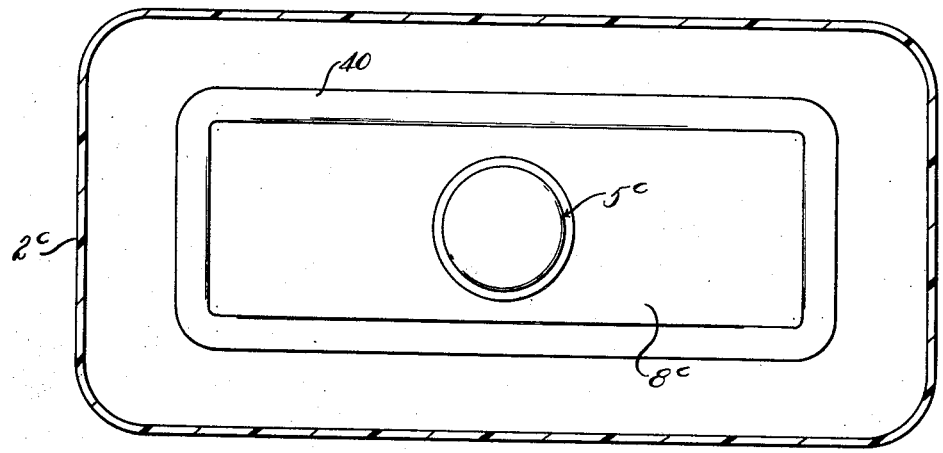
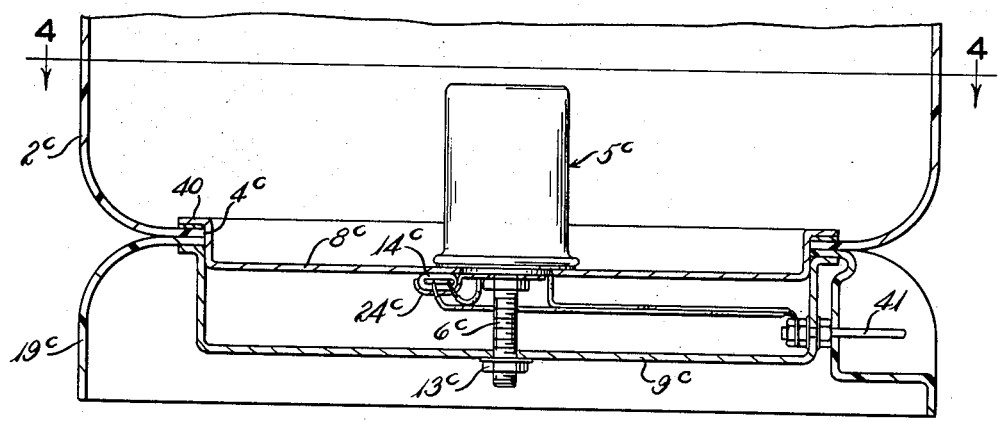
FIG. 5
INVENTORS
ALTON R. WELLS
ROBERT M. WELLS
BY
ATTYS.

United States Patent Office 3,187,163
Patented June 1, 1965

3,187,163
COMBINATION CONTAINER, HEATER AND CONTROL UNIT
Alton R. Wells, 4573 W. Tradewinds Ave., Lauderdale-by-the-Sea, Fla., and Robert M. Wells, 4371 Ira Road, Akron, Ohio
Filed Oct. 25, 1962, Ser. No. 232,013
12 Claims. (Cl. 219—441)

The present invention, generally speaking, relates to a combined container, heater and control means for the heater, and especially to units, such as coffee percolators, including electrical heaters and thermostat controls and their assemblies in units of such type.

Heretofore there have been various types of percolators and other containers, or articles provided for coffee brewing and other heating actions. In many of such containers, various types of electrical heaters are assembled to be integral with the container. These various articles, in many instances, have thermostat controls provided for the heaters for controlling the amount of heat supplied to the container and thus limiting the heating of the container and the contents thereof. These containers, and particularly percolators, have relatively high operating temperatures so that such containers, that are in direct heat conductive relationship with the electrical heater units, become objectionably hot to the touch, and heat may be wasted in the percolating, or other heating action.

Heretofore the containers that are in use today for heating of the contents thereof are primarily, if not exclusively, made from metal, and hence the containers are limited in design as to the appearance, shape and color provided therein. Likewise, it is very difficult, if not impossible, to provide attractive, satisfactory matching sets of metal cups for the heating containers where the cups would be of the same general design as the heating container. Furthermore, these metal containers are relatively expensive. The metal containers, in some instances, have an aperture provided through the bottom of the container and an electric heater unit is positioned in these containers in some instances by means of an integral stud that extends downwardly from the electrical heater unit through the aperture in the container base to be secured thereto by some external means, such as a locking nut secured to the lower end of the stud. The electric heater usually includes a metal shell which is in direct heat conductive relationship with the metal base in the container.

The general object of the present invention is to provide a novel and improved type of a container characterized by the thermal isolation of the electrical heater from the container base itself.

Another object of the invention is to provide a novel positioning and thermal insulating plate or disc in a container used for heating liquids where the electrical heater means is secured to the novel plate that is operatively secured to the container in fluid tight engagement therewith.

A further object of the invention is to provide a container having a relatively large aperture in the bottom thereof and where a pair of complementary shaped dished plates are secured to the container bottom in opposed relationship to each other to provide an enclosed air space at the bottom of the container in which a thermostat for control of the electircal heater is protectively positioned, and where the electric heater is secured to the upper of the opposed plates and extends upwardly into the container for heating action therein.

Yet another object of the invention is to provide a container for heating liquids therein where a large aperture is provided in the base of the container and where such aperture is sealed by means of one or more positioning plates secured to the container base in fluid tight relationship thereto and which positioning plate or disc also is used to secure a support or base to the container by means used for attaching an electrical heater unit to the metal positioning plate, or plates.

A further object of the invention is to provide a novel and improved type of a plastic container made either of the thermoplastic or thermosetting material, or the like including chemically fabricated substances, which container may have an integral support base, with an electrical heating unit being attached to the container bottom by a special thermally isolating type of a support plate or disc, which container is of attractive appearance and is made at low cost.

Yet a further object of the invention is to provide novel means for positioning heater elements in containers for insulating the heater from the container body to permit materials other than metal, and having much lower thermal characteristics than metal, to be used in the construction of such containers.

The foregoing and other objects and advantages of the invention will be made more apparent as the specification proceeds.

Attention now is particularly directed to the accompanying drawings, where:

FIG. 4 is a horizontal section on line 4—4 of FIG. 5 of a further modification of the invention; and FIG. 5 is a fragmentary vertical section of the container, heater and control unit of FIG. 4.

When referring to corresponding members shown in the drawings and referred to in the specification, corresponding numerals are used to facilitate comparison therebetween.

Figure 1:
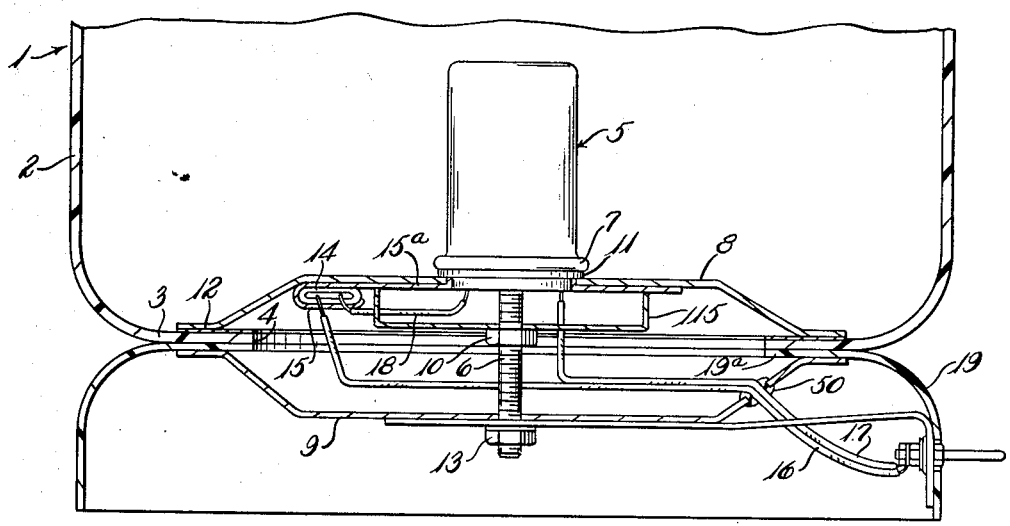
FIG. 1 is a fragmentary vertical section of a novel container, heater and control unit embodying the principles of the invention.

Generally speaking, the present invention, in one embodiment thereof, relates to the combination of a container having a bottom with an aperture therein, an electric heater, clamshell means including an upper and a lower metal plate of greater size than the aperture in the container, the upper of the metal plates being in contact with liquid in the container in normal use and having the electric heater operatively secured thereto, the metal plates being positioned at their edges on opposite surfaces of the bottom portion, means operatively engaging the clamshell means and extending therebetween to clamp them against the container bottom to seal the aperture therein and position the heater operatively within the container, a thermostat positioned between the metal plates in good heat exchange relation to the upper one of the metal plates, a terminal member operatively secured to the container, and lead means connecting the thermostat to the heater and connecting to the terminal member.

The improved article of the invention is indicated by the numeral 1 which refers to the container, heater, and control unit of the invention. This novel and improved article, or unit of the invention includes a container 2 which is of any desired shape, and which container may be made from either metal or any suitable type of a plastic material, with the construction of the invention being particularly adapted for use with containers made from known plastic substances. This container 2 has a generally disc-like bottom, or base 3 provided thereon which has a centrally positioned aperture 4 that may, for example, form a major portion of the base of the container.

A substantially conventional electrical heater unit, or heater 5 is provided which heater has a stud 6 of known construction secured in some manner to the heater 5 and extending downwardly therefrom. The heater 5 includes a resistance coil suitably positioned therein, and such coil may be localized adjacent the middle or the lower end of the heater unit, as desired. Usually the heater 5 includes a metal outer can or receptacle in which the components thereof are positioned, and such heater includes a means, such as a flange 7, provided at or adjacent its lower end, extending outwardly from the remainder of the container to form a base portion on which the heater 5 can be supported, as hereinafter described.

As a feature of the present invention, one or more metal plates are provided for positioning the electrical heater 5 in the container 2. In the embodiment of the invention shown in FIG. 1, there is shown a pair of similarly shaped, dished, metal upper and lower plates 8 and 9, respectively. These plates 8 and 9, the upper one of which at least is made from stainless steel, or other suitable material of low thermal conductivity, are of greater size or diameter than the aperture 4 in the container base and the plates are positioned in opposed relation on the opposite vertical sides of the base 3 with the stud 6 of the heater extending through central apertures in these plates. It will be seen that the upper plate 8 has the heater 5 secured thereto by a lock nut 10 on the stud 6, as hereinafter described in detail. Or, the stainless steel can of the heater 5 can be welded to the stainless steel plate 8. As a further modification described hereinafter in more detail, the can and positioning plate can be made integrally. However, the flange 7 of the heater is separated from the plate 8 by a suitable seal, or gasket ring 11. With some material, it may be desirable to provide a similar seal ring, or gasket 12 between the lower portion of the upper plate 8 and the base 3 of the container. The two metal plates 8 and 9 are secured together into compressive engagement with the base 3 to seal the aperture 4 therein by a member, such as a lock nut 13, engaging the lower end of the stud 6. It will be seen that the dished shape and opposed poistioning of the plates 8 and 9, plus the inherent strength of the metal forming the plates, permits appreciable compressive pressures to be exerted on the base of the container 2 so that an effective seal can be provided therefor to retain liquids being heated in the container 2.

It also is a feature of the invention that a suitable known type of a thermostat 14 is positioned intermediate the plates 8 and 9 in good heat exchange relationship with the contents of the container 2 and with the heater 5. Thus the thermostat 14 is positioned on an overhanging bracket 15 that is formed on one marginal portion of an annular member 15a carried by the heater 5 on the bottom surface of the upper plate 8. A clip 115 bridges over the lower end of the heater 5 and engages the stud 6. A suitable lock nut 10 forces both ends of the U-shaped clip 115 against the annular member 15a to secure the heater 5, upper plate 8 and annular member together. The thermostat 14 has a metal case that is positioned in good heat conductive contact with the heater 5 by the bracket 15 on the annular member 15a engaging the principal surfaces of the thermostat case for good heat exchange relationship with both the heater 5 and the plate 8, as explained hereinafter. Preferably the annular member 15a and bracket 15 are made from good heat conductive materials, such as aluminum. It will be realized that the stainless steel plate 8 is of low heat conductivity to substantially isolate and insulate the heat generated in the heater 5 from the walls of the container 2, so that such plastic walls during dry runs of the container are of appreciably lower temperatures than the walls of prior types of containers of this type, particularly when such other containers are made from metal. For example, a stainless steel heater of a wattage of 1000 or more can be operated on a "dry run" without liquid, the temperature of the sides of the heater being at a red heat of more than 1500° F., while all portions of the container remain below 200° F.

Suitable electrical leads connect to the heater 5 and the thermostat 14 to connect them in series for controlled heating actions. Hence a pair of input leads 16 and 17 are shown with the lead 16 connecting to the heater 5 while the lead 17 extends to the thermostat 14. The circuit is completed by a lead 18 extending from the thermostat 14 to the heater 5 so that the thermostat can shut off power to the heater when predetermined temperatures are reached by the plate 8 in contact with the liquid in the container.

It will be realized that the heater 5 and the other components of the invention can be made of any desired wattage, or strength, and beyond that now used in other designs of similar articles, to provide the desired heating action and container construction.

FIG. 1 of the drawings also shows that a base 19, which has an upwardly and inwardly extending but open upper end 19a, may be secured to the container 2 by the plates 8 and 9 when compressed into engagement with the container 2 so that an effective integral, easily made assembly is provided by the invention.

Figure 2:
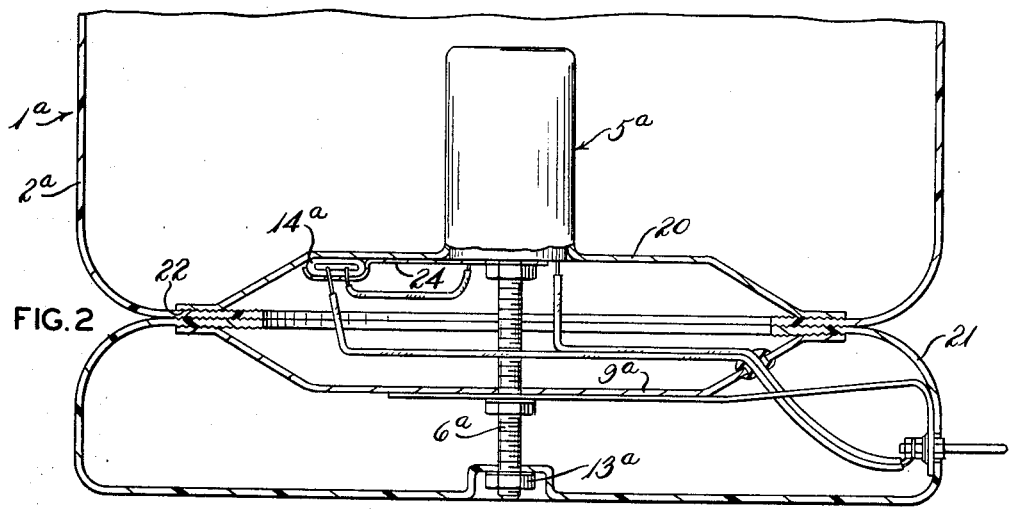
FIG. 2 is a fragmentary vertical section of a modification of the invention.

FIG. 2 shows a modified container, heater and control unit 1a of the invention. In this instance, a container 2a is made from a suitable thermosetting plastic material such as melamine, or a suitable thermoplastic material, such as high density polyethylene, although it will be realized that other materials can be substituted therefor, when suitable. In this instance, a heater 5a has a metal enclosure or can with an integral base flange 20 that extends substantially radially outwardly therefrom and is generally of the same contour as the upper stainless steel plate 8 in the other unit of the invention. The heater case and flange 20 are preferably formed of stainless steel. This base flange or plate 20 is shaped complementary to and is positioned in opposed relationship to the lower metal plate 9a shown in the unit of FIG. 2. Any suitable base means 21 can be attached in any desired manner to the container of the heater 5a to enclose the base end thereof and it is shown secured to the downwardly extending stud 6a in this unit. Such base means 21 can be formed integrally with the container 2a, as a single molded article, as shown in FIG. 3.

A novel and different seal means is provided in the unit shown in FIG. 2 and thus a single, or a plurality of serrations, or concentric ribs 22 are shown on the lower surface of the marginal portion of the heater base flange 20, as well as on the upper surface of the marginal portions of the lower plate 9a. These ribs 22 may be molded in the container, or be formed by the compressive pressure of the plates 9a and 20 that have ribs formed thereon at their sealing surfaces. Such ribs or serrations 22 may be of such size as to aid in indexing the parts when assembled.

Any suitable clamp arm 24, or a member like the clip 115 and associated means of FIG. 1, is secured to the heater stud 6a to position a thermostat 14a against the lower surface of the plate 20.

Figure 3:
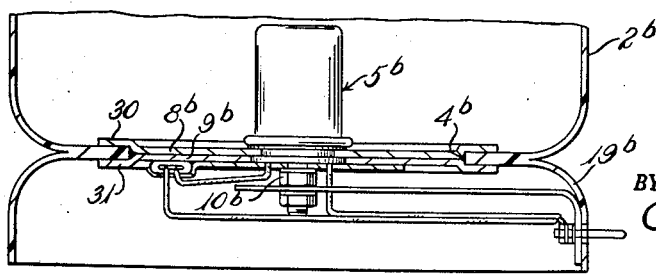
FIG. 3 is a fragmentary vertical section of a further modification of the invention.

FIG. 3 shows an improved plastic container 2b that has an integral support base 19b formed therewith. An aperture 4b, formed in the bottom or base of the container 2b, in this instance, is closed by a pair of flat plates 8b and 9b which have opposed, offset annular edge flanges 30 and 31, respectively, engaging marginal portions of the aperture 4b. Lock nut 10b secures the heater 5b and the plates 8b and 9b together as in the other embodiments of the invention. It also is possible to form the plates 8b and 9b as an integral unit with the edge flange 31 initially extending downwardly and being rolled or otherwise suitably pressed down to flat clamping engagement with the container bottom after assembly of the heater, plates and container. Again, at least the plate 8b is made of stainless steel.

FIG. 4 shows that a container 2c of generally rectangular, or other desired shape may be used in the invention. An elongated hole 4c is formed in the base of the container 2c and an elongated stainless steel upper support plate 8c engages the margins of the hole 4c by an edge flange 40. A heater 5c extends through an aperture in the support plate 8c and preferably contacts a thermostat 14c. The thermostat is positioned against the lower surface of the support plate 8c and of the heater 5c by a clamp arm 24c engaging the heater stud 6c.

A cup-shaped metal lower plate 9c telescopically engages the upper plate 8c and is clamped to the container 2c by a nut 13c on the stud 6c. Such nut 13c also secures the heater 5c in position on the support plate 8c. A separate metal or plastic base 19c is also clamped in position between the plates 8c and 9c. Conventional terminal prongs 41 are carried by the lower plate 9c so that the leads and controls for the container are in a waterproof compartment, if desired. The heater 5c and support plate 8c can be assembled in the container 2c from the bottom thereof through the hold 4c. After or during full assembly as above, the nut 13c on the stud 6c, and the opening in the plate 9c through which the stud extends, may be sealed by an epoxy material, or equivalent, to provide a sealed operating compartment for the heater, thermostat and power leads, both dustproof and tamperproof in operation and immersible for complete external cleansing of the appliance.

It should be noted that in some instances it may be necessary to make the metal support plates of the invention from conventional metallic materials, including aluminum, which do not have the desired low rate of heat conductivity, as does the stainless steel and equivalent materials. However, some benefits from the invention still can be realized from the construction of the invention even without the desirable low heat conductivity in the metal support plate. Additional or thicker gasket means might be required in such instances to help insulate the metal support plate from the plastic container, or the plastic container may be made from more heat resistant material to provide a useful, desirable structure.

It also should be noted that in some instances, the electric heater means used in the units of the invention may not have a support stud extending downwardly therefrom, as electric heaters have been made with a threaded base portion upon the metal closure for the heater at the lower end thereof, and then the electric heater, for example, could be secured to a metal support plate by a lock nut engaging the threaded lower end of the can. The can of the heater would have an annular flange thereon at the upper end of this threaded section on the can to be drawn against the upper surface of the support plate to aid in securing the can in position. The invention contemplates the use of any type of electric heaters in the containers of the invention. If a downwardly extending stud is provided on the heater, it can be secured to the heater enclosure, or can in any known manner.

In assembling and building containers of the invention, any suitable known type of thermostat means, fuses, and equivalent means may be provided in the electrical control circuit. The thermostats and/or fuses are preferably in good heat conductive contact with the metal support plates used in the containers. These thermostats, as used in the practice of the invention, may be of the periodic, or pulsing swing type principle. Thus the thermostat will have an on-off action in opening and closing the control circuit for the heater to maintain the contents of the container at a desired temperature, for example, after coffee has been brewed therein.

The gasket 11, FIG. 1, normally would be eliminated if the heater can is welded to its support plate. The heater can of FIG. 1, for example, has a downwardly extending section thereon to aid in positioning it on the plate 8 by snug engagement with the hole provided in such plate 8.

From the foregoing, it will be seen that a novel and improved container, heater and control means has been provided by the invention. This invention provides a large aperture in the base of the container and both isolates and measurably insulates the heater means from the base of the container by the special positioning plate for the heater unit. An effective but controlled heating action is obtained by a thermostat that is in good heat conductive contact with the heater unit, for safety cut-out on dry operation, as well as good contact with the support or positioning plate for normal temperature control during operation with liquids.

Suitable adhesive and/or sealing cements may be used to aid in bonding the metal support plate, or plates to the containers.

It is submitted that the novel and improved unit of the invention can be made at lower cost in comparison with similar articles made of conventional metals, that a very attractive unit can be obtained when the container is made from colorful and textured plastic, that a suitable safety means is present in the container assembly to prevent any damage to the container even under extreme conditions, as when the power is supplied to the heater with no liquid within the container, and that the unit of the invention is adapted to give a long service life with a minimum of maintenance thereon.

The containers of the invention can be used for heating any desired liquids, such as milk, or water, and for making, for example, tea, chocolate, or coffee.

The plates 8 and 9, or their counterparts, in effect, form a clamshell in which the thermostat is protectively positioned so that it will stay clean over a long period of service and cannot be tampered with readily. This clamshell will also normally keep the thermostat and associated means dry as a grommet 50 (FIG. 1) through which the leads 16 and 17 extend is substantially water tight (but usually will permit air or steam under slight pressure to pass therethrough). Should any condensation occur at any time within the clamshell, or any moisture accumulate during any cleaning or washing of the appliance, the grommet 50, or equivalent, will permit air or steam under slight pressure to escape from the clamshell.

It should be realized that any standard type of connecting means, plug, socket unit, or the like, can be provided for the electric leads used in association with the container means of the invention so that a standard fitting can be engaged with the container unit for supplying power thereto. The plastic containers may be of any desired colors and shapes and may even have a single metal support plate of low thermal conductivity molded integrally therewith. It also may be possible to obtain a satisfactory connection between the plastic container and the metal support plate for the heater by a heat seal action when the container is made from thermoplastic material. An attractive, durable but relatively inexpensive unit has been provided. Hence, it is believed that the objects of the invention have been achieved.

While several certain representative embodiments and details of the invention have been disclosed herein, it will be appreciated that modification of these particular embodiments of the invention may be resorted to without departing from the scope of the invention, as defined in the appended claims.

What is claimed is:

1. In combination,
   a plastic container having a flat disc-like base with a center aperture therein,
   an electrical heater unit having a stud operatively carried thereby and extending downwardly therefrom,
   a pair of similar dished metal plates of greater size than said aperture, said plates being made from stainless steel,
   said plates being positioned in opposed relation and opposite vertical sides of said base and having said stud extending therethrough, means securing the upper one of said metal plates and said heater unit together, means engaging said stud to secure said plates to said container to seal said aperture, a thermostat operatively positioned between said plates, circuit means connecting said thermostat and heater unit together for controlled supply of electrical energy to said heater unit, and a base means operatively secured to said container to provide a support therefor.

2. In combination, a container having a flat disc-like base with a center aperture therein of a diameter greater than one-half the diameter of said base, an electrical heater unit having a stud extending downwardly therefrom, a pair of dished upper and lower metal plates of greater diameter than said aperture, at least said upper plate being made of a metal having a low rate of heat conductivity, means securing said metal plates and said heater unit together with said plates being in opposed relation on opposite sides of said base to secure them to said container to seal said aperture, said heater unit extending upwardly into said container, a thermostat operatively carried by said stud between said plates and in heat conductive contact with said upper plate and said heater unit, and circuit means connecting said thermostat and heater unit together for controlled supply of electrical energy to said heater unit.

3. In combination, a plastic container having a bottom wall with a center aperture therein extending over a substantial portion thereof, an electrical heater means, a stud operatively carried by said heater means and extending downwardly therefrom, a pair of similar dished metal plates of greater size than said aperture, said plates being positioned in opposed relation on opposite sides of said bottom wall to cover the aperture therein and having said stud extending through the lower of said metal plates, the upper one of said metal plates being operatively secured to said heater means, means engaging said stud to secure said plates to said container bottom wall to seal said aperture, a thermostat operatively positioned between said plates, wire means connecting said thermostat and heater means together for controlled supply of electrical energy to said heater means, and a base operatively secured to said container to provide a support therefor.

4. A combination as in claim 3 where said metal plates have complementary downwardly dished center portions therein and the center portion of said upper plate is telescopically received in the downwardly dished portion of said lower plate to aid in positioning said metal plates.

5. In combination in a portable electric appliance, a plastic container having a bottom wall terminating in an aperture extending over a substantial portion thereof, an electrical heater unit, an upper and a lower metal plate of greater size than said aperture, said heater unit being secured to a center portion of said upper metal plate in sealed engagement therewith, edge portions of said upper metal plate being radially spaced from said heater unit by a continuous portion of said metal plate, edge portions of said metal plates compressively engaging opposite surfaces of said plastic container bottom wall to seal said aperture and position said heater unit within but spacially insulated from said plastic container by said continuous portion of said upper metal plate, a stud operatively carried by said heater unit and extending down through said lower plate, a thermostat positioned between said plates in heat flow relation to the lower surface of said upper metal plate, circuit means connecting to said theremostat and said heater means and being connectable to a power supply, base means for said plastic container, and means operatively engaging said stud, metal plates and base means to secure said base means to said plastic container and to secure said metal plates to said bottom wall.

6. In combination in a portable electric appliance, a container having a bottom wall terminating in an aperture extending over a substantial portion thereof, an electrical heater unit, an upper and a lower metal plate of greater size than said aperture, said heater unit being operatively secured to a center portion of said upper metal plate, edge portions of said upper metal plate being radially spaced from said heater unit by a continuous portion of said metal plate, edge portions of said metal plates compressively engaging opposite surfaces of said container bottom wall to seal said aperture and position said heater unit within but spacially insulated from said container by said continuous portion of said upper metal plate, a stud carried by said heater unit and extending down through said lower plate, a thermostat positioned between said plates, wires means connecting to said thermostat and said heater means and extending through said lower plate to be connectable to a power supply, grommet means sealing said wire means to said lower metal plate in an at least substantially water tight manner, base means for said plastic container operatively secured thereto, and means operatively engaging said stud and said lower metal plate to clamp said metal plates to said bottom wall.

7. In combination, a container having a bottom wall with an aperture therein extending over a substantial portion thereof, an electrical heater means, a support means operatively carried by said heater means and extending downwardly therefrom, a pair of metal plates of substantially the same shape and of greater size than said aperture, said plates being positioned on opposite vertical sides of said bottom wall to cover the aperture therein and having said support means extending through the lower one of said plates, the upper one of said metal plates being operatively associated with said heater means in a liquid tight manner at an aperture in said upper plate to position said heater means in said container, means engaging said support means to secure said plates with peripheral portions thereof clamped against said container bottom wall to seal said aperture, a thermostat operatively positioned between said plates and adjacent the upper one of said plates in heat flow relation therewith, circuit means connecting said thermostat and heater means together for controlled supply of electrical energy to said heater means, and a base operatively secured to said container to provide a support therefor.

8. In combination, a container having a bottom wall with a center aperture therein extending over a substantial portion thereof, an electrical heater means including a metal enclosure means, a support member operatively associated with said heater means and extending downwardly therefrom, a metal plate of greater size than said aperture, said metal enclosure having a flange formed integrally therewith and extending substantially radially therefrom, said flange being of substantially the same peripheral dimensions as said metal plate, said plate and said flange being positioned in opposed relation on opposite vertical sides of said bottom wall to cover the aperture therein and having said support member extending through said metal plate which is below said bottom wall and said flange is above such wall, means engaging said support member to secure said plate and said flange to said container to seal said aperture and to position said heater means operatively in said container, a thermostat operatively positioned between said plate and flange, and circuit means connecting said thermostat and heater means together for controlled supply of electrical energy to said heater means.

9. In combination, a plastic container having a bottom portion with an aperture therein extending over a substantial area thereof, an electrical heater, clamshell means including a pair of metal plates of greater size than said aperture, one of said metal plates which is in contact with liquid in said container having said heater operatively secured thereto, said metal plates being positioned on opposite vertical surfaces of said bottom wall, the upper of said metal plates having a frictionally faced edge portion engaging said bottom portion, means operatively engaging said clamshell means and extending therebetween to secure them together and to said container to seal said aperture and position said heater operatively wtihin said container, a thermostat positioned between said metal plates in good heat flow relation to the upper one of said metal plates, and lead means connecting said thermostat to said heater for connection to a power supply.

10. In combination, a container having a bottom portion with an aperture therein, an electrical heater, clamshell means including a pair of metal plates of greater size than said aperture, one of said metal plates having said heater operatively secured thereto to extend upwardly into said container, said metal plates being positioned on opposite vertical surfaces of said bottom portion and forming an enclosed chamber, means operatively engaging said clamshell means and extending therebetween to secure them to said container to seal said aperture and position said heater unit operatively within said container, a thermostat positioned in said chamber, lead means connecting said thermostat to said heater and extending through the lower of said metal plates for connection to a power supply, and means sealing said lead means to said lower metal plate in an at least substantially water tight manner where said lead means extend therethrough.

11. In combination in a portable electric appliance, a container having a bottom portion with an aperture therein, an electrical heater, clamshell means including a pair of metal plates of greater size than said aperture, one of said metal plates which is in contact with liquid in said container in normal use having said heater operatively secured thereto, said metal plates being positioned on opposite vertical surfaces of said bottom portion, means operatively engaging said clamshell means and extending therebetween to clamp them against said container bottom portion to seal said aperture and position said heater until operatively within said container, a thermostat positioned between said metal plates in good heat flow relation to the upper one of said metal plates, and lead means connecting said thermostat to said heater and operatively extending from said metal plates for connection to a power supply.

12. In combination in a portable electric appliance, a container having a bottom portion wtih an aperture therein, an electrical heater, clamshell means including an upper and a lower metal plate of greater size than said aperture, the upper of said metal plates being in contact with liquid in said container in normal use and having said heater operatively secured thereto, said metal plates being positioned on opposite vertical surfaces of said bottom portion, means operatively engaging said clamshell means and extending therebetween to clamp them against said container bottom portion to seal said aperture and position said heater operatively within said container, a thermostat positioned between asid metal plates in good heat exchange relation to said upper one of said metal plates, a terminal member secured to said lower of said metal plates and extending therethrough, and lead means connecting said thermostat to said heater and connecting to said terminal member.

References Cited by the Examiner

UNITED STATES PATENTS

| | | | |
|---|---|---|---|
| 1,731,882 | 10/29 | Backer | 219—436 |
| 1,782,958 | 11/30 | Dym | 219—436 |
| 1,944,438 | 1/34 | Larsen | 219—436 |
| 2,046,710 | 7/36 | Umstott. | |
| 2,550,751 | 5/51 | Adams | 219—536 |
| 2,730,610 | 1/56 | Farr et al. | 219—441 |
| 2,929,908 | 3/60 | Parker et al. | 219—437 |
| 2,977,454 | 3/61 | Volker | 219—331 |

FOREIGN PATENTS

| | | |
|---|---|---|
| 728,676 | 4/55 | Great Britain. |
| 190,184 | 6/57 | Austria. |
| 864,363 | 4/61 | Great Britain. |

RICHARD M. WOOD, *Primary Examiner.*

ANTHONY BARTIS, *Examiner.*